US 11,975,847 B2

(12) United States Patent
Clarke et al.

(10) Patent No.: US 11,975,847 B2
(45) Date of Patent: May 7, 2024

(54) ICE PROTECTION SYSTEMS FOR AIRCRAFT

(71) Applicant: General Electric Company, Schenectady, NY (US)

(72) Inventors: Brandon C. Clarke, Milford, OH (US); Scott Alan Schimmels, Miamisburg, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 17/655,100

(22) Filed: Mar. 16, 2022

(65) Prior Publication Data

US 2023/0294833 A1    Sep. 21, 2023

(51) Int. Cl.
| | |
|---|---|
| *B64D 15/12* | (2006.01) |
| *B64D 27/10* | (2006.01) |
| *B64D 29/00* | (2006.01) |
| *F02C 9/00* | (2006.01) |
| *G05D 23/19* | (2006.01) |

(52) U.S. Cl.
CPC ............ *B64D 15/12* (2013.01); *B64D 27/10* (2013.01); *B64D 29/00* (2013.01); *F02C 9/00* (2013.01); *G05D 23/1919* (2013.01)

(58) Field of Classification Search
CPC ........ F05D 2270/17; F02C 7/047; F02C 7/04; B64D 15/14; B64D 15/20
See application file for complete search history.

(56) References Cited

U.S. PATENT DOCUMENTS

| | | | | |
|---|---|---|---|---|
| 5,301,905 A | * | 4/1994 | Blaha ..................... | B64D 15/20 244/134 F |
| 6,725,645 B1 | | 4/2004 | Wadia et al. | |
| 7,034,257 B2 | * | 4/2006 | Petrenko ................. | H05B 3/84 219/202 |
| 7,513,458 B2 | | 4/2009 | Layland et al. | |
| 7,546,980 B2 | * | 6/2009 | Giamati ................. | B64D 15/14 244/134 D |
| 7,556,221 B2 | | 7/2009 | Hindel et al. | |
| 7,581,378 B2 | | 9/2009 | Brand et al. | |
| 7,673,832 B2 | * | 3/2010 | Meister ................. | B64D 15/04 244/134 R |
| 8,061,657 B2 | | 11/2011 | Rocklin et al. | |
| 8,181,900 B2 | | 5/2012 | Chene et al. | |
| 8,209,953 B2 | * | 7/2012 | Winter .................... | F02C 7/045 137/15.1 |

(Continued)

OTHER PUBLICATIONS

Ice protection system as viewed on Jan. 19, 2022. https://en.wikipedia.org/wiki/Ice_protection_system.

(Continued)

*Primary Examiner* — Thuyhang N Nguyen
(74) *Attorney, Agent, or Firm* — Venable LLP; David D. Leege; Michele V. Frank

(57) ABSTRACT

An ice protection system for an external surface for an aircraft. The external surface is configured to have air flow over the external surface and has a plurality of zones. At least one heat source is thermally coupled to the external surface in each zone of the plurality of zones. A controller is configured to selectively control the at least one heat source in each zone of the plurality of zones based on an operating condition related to the air flowing over the external surface.

20 Claims, 10 Drawing Sheets

(56) References Cited

U.S. PATENT DOCUMENTS

| | | | |
|---|---|---|---|
| 9,193,466 B2 | 11/2015 | Calder et al. | |
| 10,662,877 B2 | 5/2020 | Brown | |
| 10,723,465 B2 | 7/2020 | Skoglund et al. | |
| 11,002,188 B2* | 5/2021 | Chilukuri | F02C 7/047 |
| 11,015,525 B2 | 5/2021 | Sellers | |
| 2011/0192134 A1* | 8/2011 | Vauchel | B64D 33/02 |
| | | | 60/226.1 |
| 2013/0266419 A1* | 10/2013 | Richardson | F02C 7/045 |
| | | | 415/117 |
| 2018/0080378 A1* | 3/2018 | Alecu | F02C 6/02 |
| 2018/0093785 A1* | 4/2018 | Brown | B64D 15/12 |
| 2019/0039742 A1* | 2/2019 | Gordon | B64D 15/12 |
| 2019/0135443 A1* | 5/2019 | Botura | B64D 15/00 |

OTHER PUBLICATIONS

A Pilot's Guide to In-Flight Icing Course Overview and Main Menu as viewed on Jan. 19, 2022. https://aircrafticing.grc.nasa.gov/1_1_0_0.html.

* cited by examiner

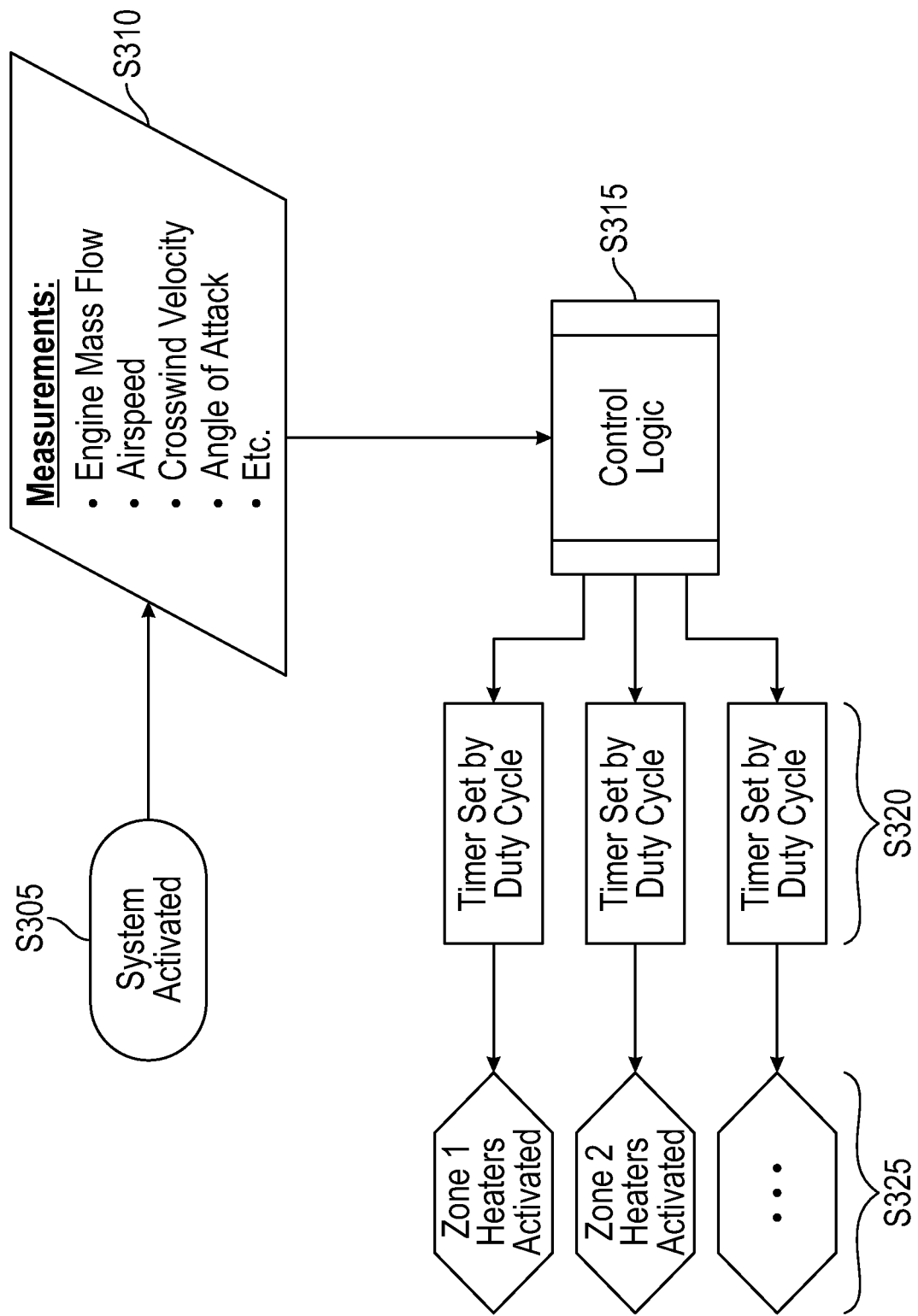

ICE PROTECTION SYSTEMS FOR AIRCRAFT

TECHNICAL FIELD

The present disclosure relates to ice protection systems, and, in particular, ice protection systems for aircraft.

BACKGROUND

The formation of ice on aircraft wings, propellers, air inlets of engines, etc., creates problems for aircraft. Accumulated ice adds considerable weight and changes the airfoil or inlet configuration, impacting the controlled airflow of these surfaces and making the aircraft much more difficult to fly. In the case of jet aircraft, pieces of ice breaking loose from the leading edge of an engine inlet housing can damage rotating fan and turbine blades or other internal engine components.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 3 is a detail view of the nacelle showing detail 3 of FIG. 2.

FIG. 4 is a detail view of the nacelle showing detail 3 of FIG. 2.

FIG. 7A shows an operating configuration for the heaters with the engine operating in a high-power condition for takeoff or climb. FIG. 7B shows an operating configuration for the heaters with the engine operating in a part-power condition. FIG. 7C shows an operating configuration for the heaters with the engine operating in a low-power (idle) condition for a descent.

FIG. 8A shows an operating configuration for the heaters with the engine operating in a part-power condition and the aircraft (engine) having a high angle of attack. FIG. 8B shows an operating configuration for the heaters with the engine operating in a part-power condition and the engine exposed to a right sideslip condition.

FIG. 9 is a schematic flow chart for a method of controlling the heaters.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

Aircraft engine nacelles are subject to icing conditions, particularly, the nacelle leading edge at the inlet lip while the engine is on the ground and, especially, under flight conditions. Ice protection systems that may be suitably used on the inlet lip of the nacelle or other suitable aircraft surfaces are discussed herein. These ice protection systems may be used to remove ice buildup (de-icing) and prevent ice buildup (anti-icing). In some embodiments, the ice protection system includes resistive heating elements. Such resistive heating elements may draw considerable amounts of power and a high duty cycle for these heating elements reduces the lifetime (time on wing) of the heating elements. The ice protection systems discussed herein control the heating elements based on the conditions in which the engine and/or aircraft are operating (current operating conditions). Under certain conditions, a surface, such as a portion of the lip of the engine nacelle, may be likely to experience icing conditions, but, in other conditions, this surface is less likely to experience icing. By controlling the ice protection systems based on the current operating conditions, the operation of the heating elements can be targeted such that the duty cycle of the heating elements for a particular surface is reduced for conditions where that surface is less likely to experience icing as compared to conditions where that surface is more likely to experience icing. By using this approach, the lifetime (time on wing) of heating elements can be increased and the power draw of the ice protection system can be reduced.

Figure 1:
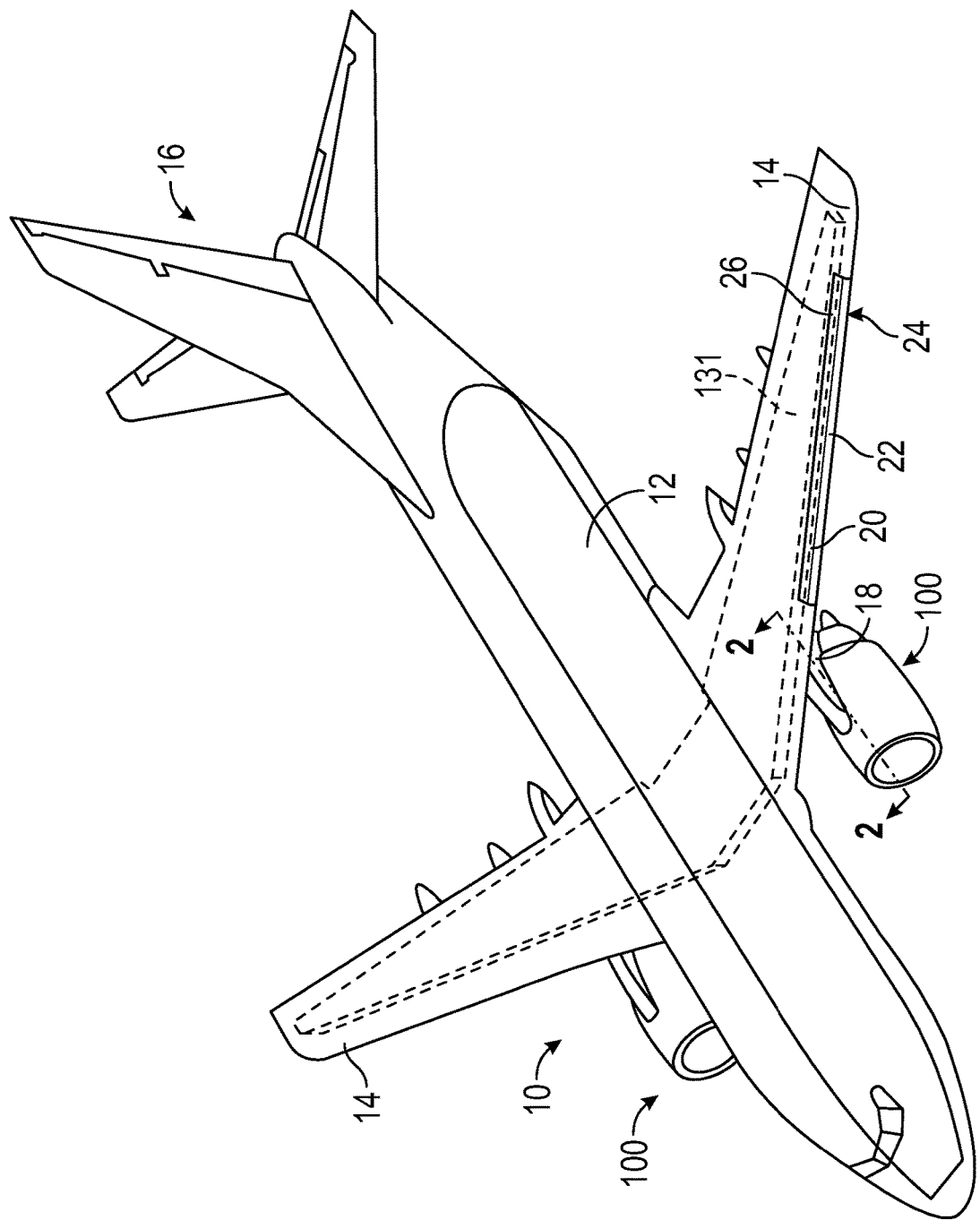
FIG. 1 is a schematic perspective view of an aircraft that may use the ice protection systems of the present disclosure.
Figure 3:
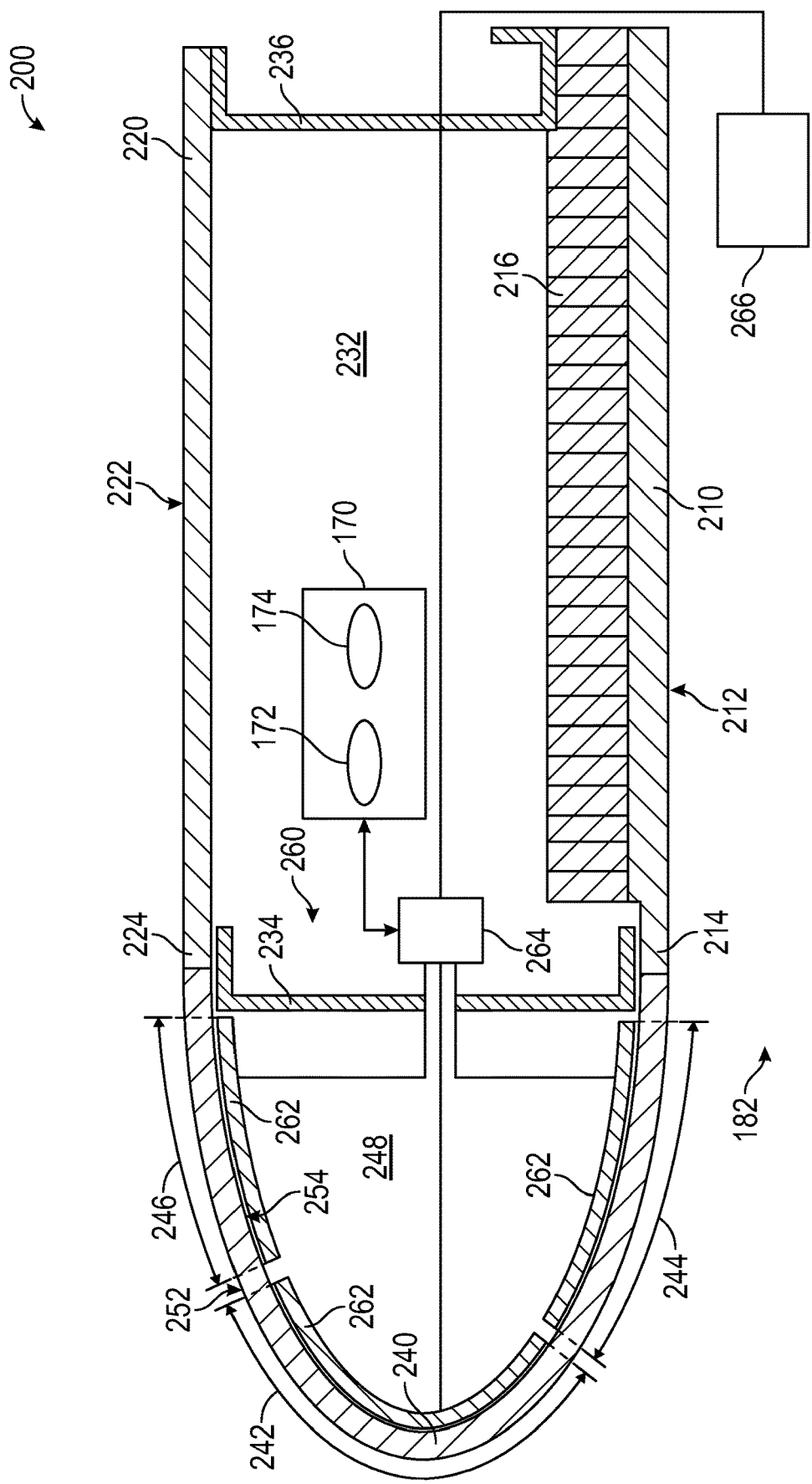
FIG. 3 shows an ice protection system according to an embodiment of the present disclosure.

The ice protection systems discussed herein are suitable for use on aircraft. FIG. 1 is a perspective view of an aircraft 10 that may implement various preferred embodiments. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 (as shown in FIG. 3), and the fuselage 12. Although the aircraft 10 shown in FIG. 1 is an airplane, the embodiments described herein may also be applicable to other aircraft, including, for example, helicopters and unmanned aerial vehicles (UAV).

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the engine 100 via a fuel system 130 (see FIG. 2). An aviation turbine fuel in the embodiments discussed herein is a combustible hydrocarbon liquid fuel, such as a kerosene-type fuel, having a desired carbon number. The fuel is stored in a fuel tank 131 of the fuel system 130. As shown in FIG. 1, at least a portion of the fuel tank 131 is located in each wing 14 and a portion of the fuel tank 131 is located in the fuselage 12 between the wings 14. The fuel tank 131, however, may be located at other suitable locations in the fuselage 12 or the wing 14. The fuel tank 131 may also be located entirely within the fuselage 12 or the wing 14. The fuel tank 131 may also be separate tanks instead of a single, unitary body, such as, for example, two tanks each located within a corresponding wing 14.

Figure 2:
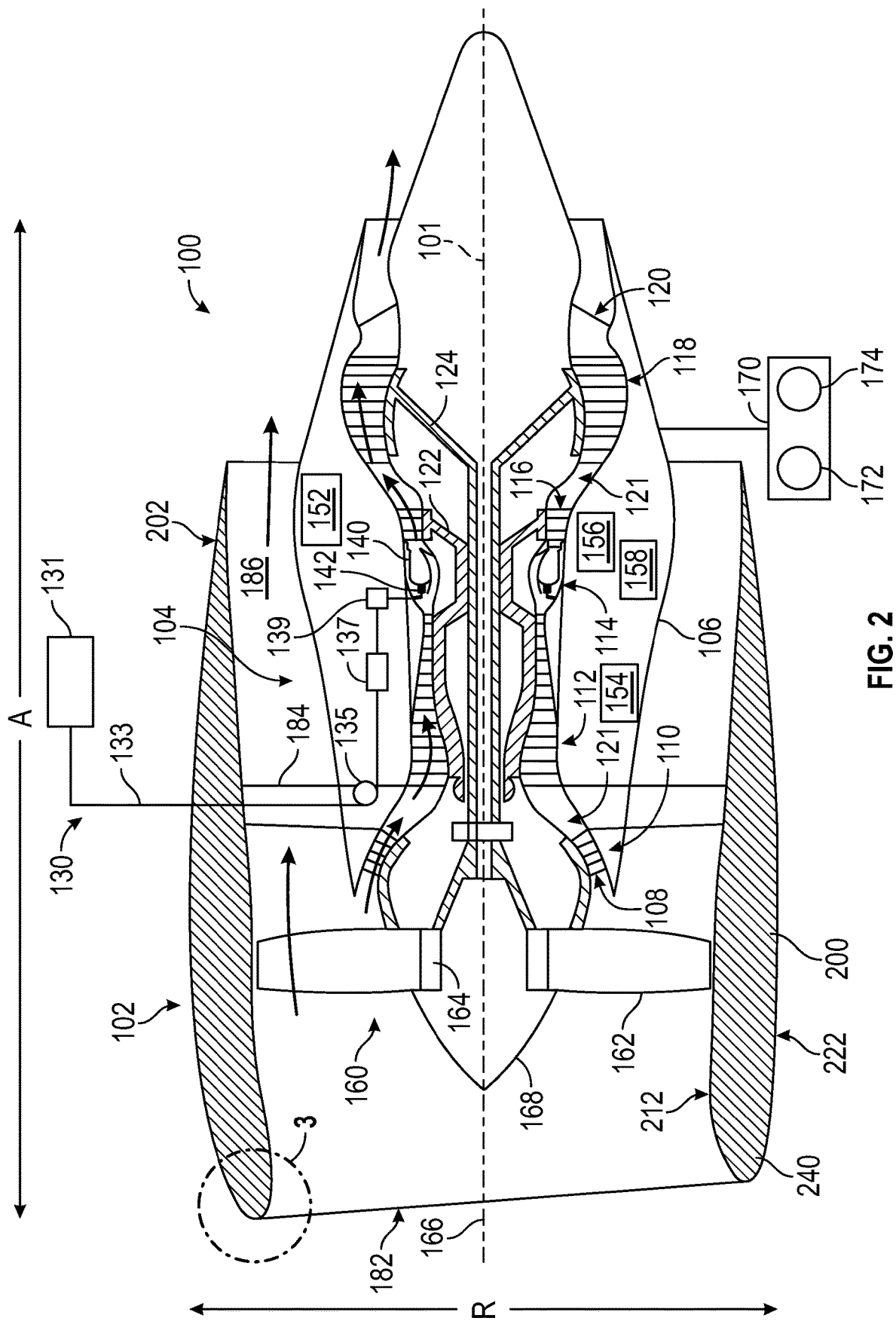
FIG. 2 is a schematic, cross-sectional view, taken along line 2-2 in FIG. 1, of one of the engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine that includes a fan section 102 and a turbomachine 104 disposed downstream from the fan section 102. The engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbomachine 104 further includes one or more drive shafts. More specifically, the turbomachine 104 includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The engine 100, more specifically, the turbomachine 104, is operable with the fuel system 130 and receives a flow of fuel from the fuel system 130. The fuel system 130 includes a fuel delivery assembly 133 providing the fuel flow from the fuel tank 131 to the engine 100, and, more specifically, to a plurality of fuel nozzles 142 that inject fuel into a combustion chamber of a combustor 140 of the combustion section 114. The fuel delivery assembly 133 includes tubes, pipes, conduits, and the like, to fluidly connect the various components of the fuel system 130 to the engine 100. The fuel tank 131 is configured to store the hydrocarbon fuel, and the hydrocarbon fuel is supplied from the fuel tank 131 to the fuel delivery assembly 133. The fuel delivery assembly 133 is configured to carry the hydrocarbon fuel between the fuel tank 131 and the engine 100 and, thus, provides a flow path (fluid pathway) of the hydrocarbon fuel from the fuel tank 131 to the engine 100.

The fuel system 130 includes at least one fuel pump fluidly connected to the fuel delivery assembly 133 to induce the flow of the fuel through the fuel delivery assembly 133 to the engine 100. One such pump is a main fuel pump 135. The main fuel pump 135 is a high-pressure pump that is the primary source of pressure rise in the fuel delivery assembly 133 between the fuel tank 131 and the engine 100. The main fuel pump 135 may be configured to increase a pressure in the fuel delivery assembly 133 to a pressure greater than a pressure within a combustion chamber of the combustor 140.

The fuel system 130 also includes a fuel metering unit 137 in fluid communication with the fuel delivery assembly 133. Any fuel metering unit 137 may be used including, for example, a metering valve. The fuel metering unit 137 is positioned downstream of the main fuel pump 135 and upstream of a fuel manifold 139 configured to distribute fuel to the fuel nozzles 142. The fuel system 130 is configured to provide the fuel to the fuel metering unit 137, and the fuel metering unit 137 is configured to receive fuel from the fuel tank 131. The fuel metering unit 137 is further configured to provide a flow of fuel to the engine 100 in a desired manner. More specifically, the fuel metering unit 137 is configured to meter the fuel and to provide a desired volume of fuel, at, for example, a desired flow rate, to a fuel manifold 139 of the engine 100. The fuel manifold 139 is fluidly connected to the fuel nozzles 142 and distributes (provides) the fuel received to the plurality of fuel nozzles 142, where the fuel is injected into the combustion chamber and combusted. Adjusting the fuel metering unit 137 changes the volume of fuel provided to the combustion chamber and, thus, changes the amount of propulsive thrust produced by the engine 100 to propel the aircraft 10.

The engine 100 also includes various accessory systems to aid in the operation of the engine 100 and/or the aircraft 10. For example, the engine 100 may include a main lubrication system 152, a compressor cooling air (CCA) system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components through the use of one or more heat exchangers. The compressor cooling air (CCA) system 154 provides air from one or both of the HP compressor 112 or the LP compressor 110 to one or both of the HP turbine 116 or the LP turbine 118. The active thermal clearance control (ATCC) system 156 acts to minimize a clearance between tips of turbine blades and casing walls as casing temperatures vary during a flight mission. The generator lubrication system 158 provides lubrication to an electronic generator (not shown), as well as cooling/heat removal for the electronic generator. The electronic generator may provide electrical power to, for example, a startup electrical motor for the engine 100 and/or various other electronic components of the engine 100 and/or the aircraft 10. The lubrication systems for the engine 100 (e.g., the main lubrication system 152 and the generator lubrication system 158) may use hydrocarbon fluids, such as oil, for lubrication, in which the oil circulates through inner surfaces of oil scavenge lines.

The engine 100 also includes an engine controller 170 configured to operate various systems of the engine 100, including for example, the ice protection system 260 discussed below. In this embodiment, the controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application specific integrated circuit (ASIC), and/or a Field Programmable Gate Array (FPGA). The memory 174 can include one or more computer-readable media, including, but not limited to, non-transitory computer-readable media, a computer readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, cause the processor 172 and the controller 170 to perform operations. In some embodiments, the instructions can be executed by the processor 172 to cause the processor 172 to complete any of the operations and functions for which the controller 170 is configured, as will be described further below. The instructions can be software written in any suitable programming language or can be implemented in hardware. Additionally, and/or alternatively, the instructions can be executed in logically and/or virtually separate threads on the processor 172. The memory 174 can further store data that can be accessed by the processor 172.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The fan section 102 shown in FIG. 2 includes a fan 160 having a plurality of fan blades 162 coupled to a disk 164. The fan blades 162 and the disk 164 are rotatable, together, about a rotation axis 166 by the LP shaft 124. In this embodiment, the rotation axis 166 is coincident with the longitudinal centerline (axis) 101 of the turbomachine 104. The disk 164 is covered by a rotatable front hub 168 aerodynamically contoured to promote an airflow through the plurality of fan blades 162. Further, an annular fan casing or outer nacelle 200 is provided, circumferentially, surrounding the fan 160 and/or at least a portion of the turbomachine 104. The outer nacelle 200 will be referred to as the nacelle 200 herein. The nacelle 200 is annular and defines an inlet 182 of the fan section 102. Although the nacelle 200 may be symmetrical, the nacelle 200 and the inlet 182 may be asymmetrical, such as having asymmetry between the top and the bottom, and asymmetry between the left and the right. The nacelle 200 is supported relative to the turbomachine 104 by a plurality of circumferentially spaced outlet guide vanes 184. A downstream section 202 of the nacelle 200 extends over an outer portion of the turbomachine 104 so as to define a bypass airflow passage 186 therebetween.

Air flows from the left side of FIG. 2 toward the right side of FIG. 2 and enters the inlet 182. A portion of the air flow may flow past the fan blades 162 and the outlet guide vanes 184 through the bypass airflow passage 186. A portion of the air flow may enter the outer casing 106 through the annular inlet 108 as the air flowing through the core air flowpath 121 to be mixed with the fuel for combustion in a combustor 140 and exit through the jet exhaust nozzle section 120, as discussed above. The nacelle 200 helps to direct the flow of air into the fan blades 162 of the fan 160.

FIG. 3 is a detail view of the nacelle 200, showing detail 3 of FIG. 2. The nacelle 200 of this embodiment includes an inner barrel 210 with an inner barrel surface 212. The inner barrel 210 may include an acoustic panel 216. The nacelle 200 also includes an outer barrel 220 with an outer barrel surface 222. Both the inner barrel 210 and the outer barrel 220 are annular with the outer barrel 220 positioned radially outward in the radial direction R (see FIG. 2). The outer barrel surface 222 circumscribes the inner barrel 210, and a barrel cavity 232 is formed between the inner barrel 210 and the outer barrel 220. The inner barrel 210 and the outer barrel 220 are connected to each other by a plurality of bulkheads, such as an inlet forward bulkhead 234 and an inlet aft bulkhead 236. The inlet forward bulkhead 234 and the inlet aft bulkhead 236 provide structural support for the nacelle 200 and, in particular, to the inner barrel 210 and the outer barrel 220.

The nacelle 200 includes a lip 240 formed on the forward end of the nacelle 200. The lip 240 is attached to a forward edge 214 of the inner barrel 210 and a forward edge 224 of the outer barrel 220. The lip 240 is aerodynamically contoured to promote airflow into the inlet 182 of the fan section 102 and the flow of air over the outer barrel surface 222. In this embodiment, the lip 240 has a U-shape with a leading (or forward) portion 242, an inner portion 244, and an outer portion 246. The lip 240 defines a lip cavity 248, which may be referred to as a D-duct. The lip cavity 248 is annular, in this embodiment. The lip 240 also includes an outer surface 252 and an inner surface 254. Air flows over the outer surface 252, and the inner surface 254 faces the lip cavity 248.

The nacelle 200 includes an ice protection system 260. The ice protection system 260 of this embodiment is configured to selectively heat portions of the lip 240 and to prevent ice from forming thereon, or if ice has already formed on the lip 240, to de-ice the lip 240. Heat is selectively applied to a region (or zone) using heat from a heat source. Any suitable heat source may be used. In the embodiment shown in FIG. 3, the heat source is a heating element and each region (or zone) includes at least one heating element 262 to selectively heat the zone. The heating elements 262 of this embodiment are resistive heating elements that provide heat when electrical current is provided thereto. The heat produced by the heating element 262 may be controlled by controlling the electrical current provided to the heating element 262. Any suitable heating element 262 may be used including for example, graphite-based electrically resistive elements or metal mesh heating elements. The heating elements 262 are thermally coupled to the lip 240 such that they heat a corresponding outer surface 252 of the region. The heating element 262 may be attached to the inner surface 254 of the lip 240 within the lip cavity 248 using, for example, a thermally conductive adhesive or fasteners. In other embodiments, the heating element 262 may be integrally formed with, such as embedded within, the lip 240.

The lip 240 is divided into a plurality of regions and heat can be selectively applied to each of the regions to heat the outer surface 252 of each of these regions. These regions may also be referred to as zones. The example lip 240 shown in FIG. 3 has three zones each corresponding to the leading portion 242, the inner portion 244, and the outer portion 246. In the embodiment shown in FIG. 3, one or more heating elements 262 are attached to each of these zones and configured to selectively apply heat to these zones. In this embodiment, the heating elements 262 are operated by a controller, such as an engine controller 170 (see also FIG. 2). Other suitable controllers may be used including, for example, a dedicated controller or a controller that is part of the flight control system for the aircraft 10 (flight controller).

The controller 170 is operatively and communicatively coupled to a power distribution module 264 that receives power from a power source 266. The power source 266 may be any suitable power source, including, for example, an electrical power source of the engine 100, such as a generator driven by rotation of one of the shafts (e.g., HP shaft 122 or LP shaft 124) of the engine 100. The power distribution module 264 is configured to selectively control the application of power to each of the heating elements 262 based on instructions (signals) provided by the controller 170, such as by providing power to the heating element 262 or disconnecting the power from the heating element 262. The controller 170, thus, is able to selectively control the operation of the heating elements 262 via the power distribution module 264. The controller 170 is configured to selectively control the at least one heating element in each zone of the plurality of zones to one of a plurality of heating levels. In some embodiments, the plurality of heating levels may include a high heating level and a reduced heating level. The heat produced in a set time interval for one of the plurality of zones is less when the zone is operated at the reduced heating level than when the zone is operated at the high heating level. As will be discussed further below, the controller 170 may selectively control the at least one heating element to one of the plurality of heating levels by controlling the duty cycle of the at least one heating element 262, where, for example, the duty cycle of the at least one heating element in the reduced heating level is less than the duty cycle of the at least one heating element in the high heating level.

The air contacting the outer surface 252 of the lip 240 will have a stagnation point. During icing conditions, ice will tend to form at the stagnation point and, thus, heat should be applied to the outer surface 252 where the stagnation point is located to prevent ice from forming. The stagnation point will, however, change based on the operating condition of the aircraft 10 and, more specifically, the engine 100. During different operating conditions, the stagnation point may be located on the outer surface 252 of any one of the leading portion 242, the inner portion 244, or the outer portion 246. Instead of heating the entirety of the lip 240, the controller 170 is configured to selectively heat only portions of the lip 240. More specifically, in this embodiment, the controller 170 is configured to determine the location of the stagnation point based on received inputs (as will be discussed further below with respect to FIGS. 9 and 10), and selectively heat certain zones of the lip 240. In some embodiments, the controller 170 will apply heat to all of the zones of the lip 240, but some of the zones will have a reduced duty cycle and will be heated less than the other zones.

Figure 4:
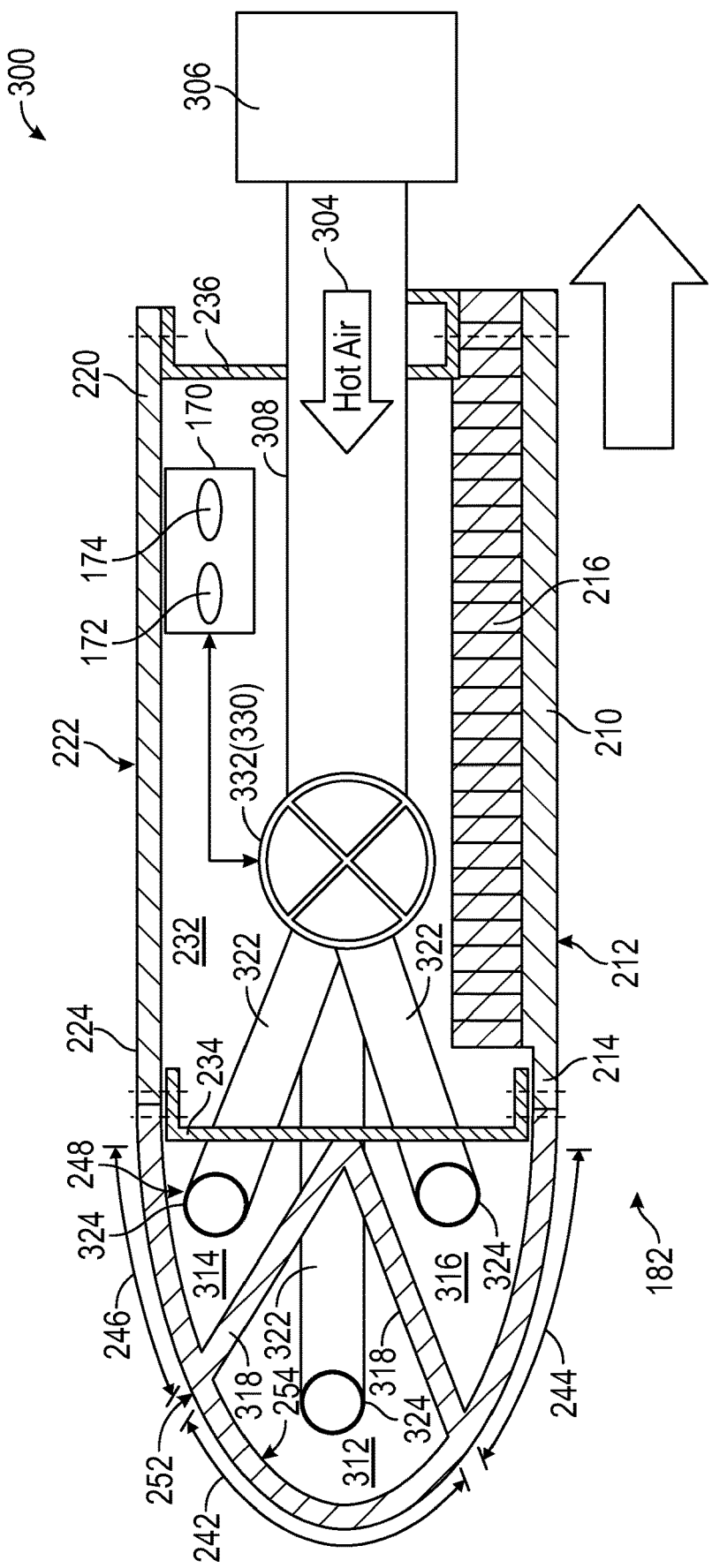
FIG. 4 shows another ice protection system according to an embodiment of the present disclosure.
Figure 5:
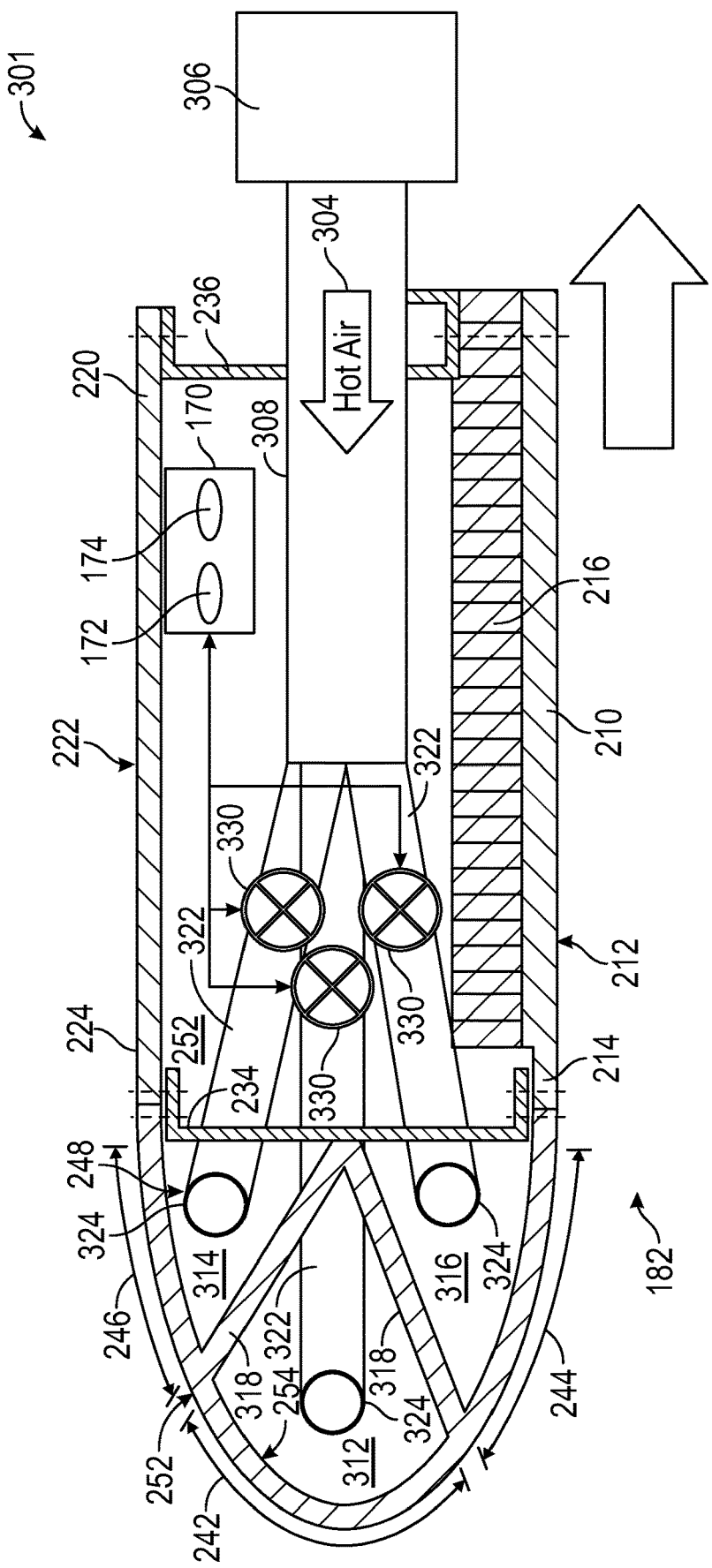
FIG. 5 shows another valving arrangement of the ice protection system shown in FIG. 4.
Figure 6:
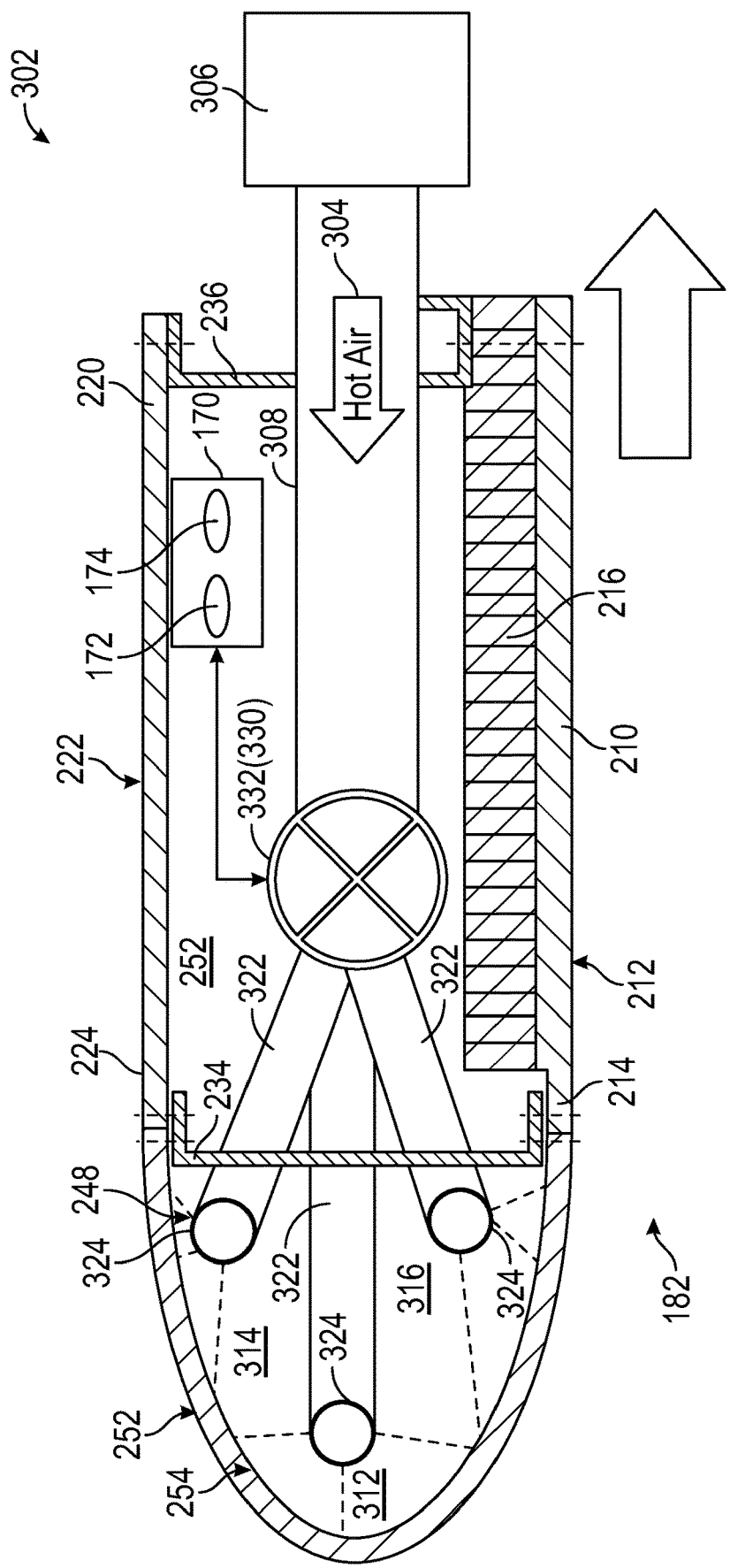
FIG. 6 shows another configuration of the ice protection system shown in FIG. 4.

FIGS. 4 to 6 show hot air 304 used as the heat source for the lip 240 as an addition or alternative to heating elements 262 described above. FIGS. 4 to 6 are detail views of the nacelle 200, showing detail 3 of FIG. 2. As noted above, any suitable heat source may be used, and pneumatic heating (a pneumatic heat system 300) is used in the ice protection system 260 in the embodiments shown in FIGS. 4 to 6. Hot air 304 is supplied from a hot air source 306 through a hot air supply duct 308. The hot air source 306 may be any suitable hot air source, including for example a source of hot air from the engine 100. Such engine hot air sources include, for example, the compressor bleed air or other bleed air, such as fan bleed air or precooler bleed air. The sources may include air heated by other engine heat sources including, for example, the main lubrication system 152, the active thermal clearance control (ATCC) system 156, and the generator lubrication system 158.

In the embodiment shown in FIG. 4, the lip cavity 248 is divided into a plurality of cavities. At least one cavity of the plurality of cavities corresponds to each zone. The lip cavity 248 may include, for example, a leading cavity 312 corresponding to the leading portion 242, an inner cavity 314 corresponding to the inner portion 244, and an outer cavity 316 corresponding to the outer portion 246. These cavities are separated from each other by cavity walls 318. The hot air supply duct 308 is fluidly connected to each of the leading cavity 312, the inner cavity 314, and the outer cavity 316 by a corresponding cavity duct 322. Each of the leading cavity 312, the inner cavity 314, and the outer cavity 316 also includes a hot air distribution manifold 324 fluidly connected to the cavity duct 322 and configured to distribute the hot air 304 the within the corresponding cavity, 312, 314, 316. Any suitable hot air distribution manifold 324 may be used including, for example, a piccolo tube or a swirl nozzle. The type of hot air distribution manifold 324 may be the same or different between the leading cavity 312, the inner cavity 314, and the outer cavity 316. When a piccolo tube is used as the hot air distribution manifold 324, the hot air distribution manifold 324 may be a three hundred sixty degreed piccolo tube, but the hot air distribution manifold 324 may also only over a portion of the circumferential direction, such as when the lip 240 is divided into a plurality of zones in the circumferential direction.

At least one valve 330 is used to selectively provide hot air to each of the leading cavity 312, the inner cavity 314, and the outer cavity 316 and, thus, selectively heat each of the leading portion 242, the inner portion 244, and the outer portion 246. In the embodiment shown in FIG. 4, the valve 330 is a pneumatic switching valve 332 configured to selectively provide hot air to each of the cavity ducts 322 or to stop the flow of air. The pneumatic switching valve 332 is shown as positioned in the barrel cavity 232, but it may be located at other positions including farther upstream in the hot air supply duct 308 and closer to the hot air source 306. The pneumatic switching valve 332 provides hot air 304 to only one of the leading cavity 312, the inner cavity 314, and the outer cavity 316 at a time. The controller 170 is operatively and communicatively coupled to the pneumatic switching valve 332 to provide hot air 304 to the leading cavity 312, the inner cavity 314, and the outer cavity 316 for a period of time in the same manner as the controller 170 controls the heating elements 262 discussed herein.

FIG. 5 shows another valving arrangement of a pneumatic heat system 301. The pneumatic heat system 301 shown in FIG. 5 is the same as the pneumatic heat system 300 shown in FIG. 4, but instead of using a single valve 330, a plurality of valves 330 are used. One valve 330 is located in each of the cavity ducts 322 to control the flow of hot air 304 in each of the cavity duct 322 and thus to each of the hot air distribution manifolds 324 in each of the leading cavity 312, the inner cavity 314, and the outer cavity 316. These valves 330 may be on/off valves that are operatively and communicatively coupled to the controller 170 and controlled based on a duty cycle in the same manner as the heating elements 262 as discussed herein. Other suitable valves may be used including, for example, a flow control valve that is throttleable so that each cavity duct 322 may receive different amounts of hot air 304. Alternatively, the valves 330 may be components of one valve with multiple discharge ports. The controller 170 may be configured to reduce the amount of heat in one of the leading cavity 312, the inner cavity 314, and the outer cavity 316, and, thus, reduce the amount of heat in the leading portion 242, the inner portion 244, and the outer portion 246, respectively. The heat may be reduced by the controller 170 in the manner discussed herein for the heating elements 262.

FIG. 6 shows another configuration of a pneumatic heat system 302. In FIGS. 4 and 5, the lip cavity 248 is separated into a plurality of cavities by cavity walls 318. The cavity walls 318 may, however, be omitted and the hot air distribution manifolds 324 are configured to direct air to a portion of the inner surface 254 of the lip 240 to selectively heat a corresponding region, as shown in FIG. 6. The hot air distribution manifold 324 preferably may be a piccolo tube in this embodiment. Although shown as using the pneumatic switching valve 332, the configuration with a valve 330 in each of the cavity ducts 322 may also be used with the configuration shown in FIG. 6.

Figure 7A:
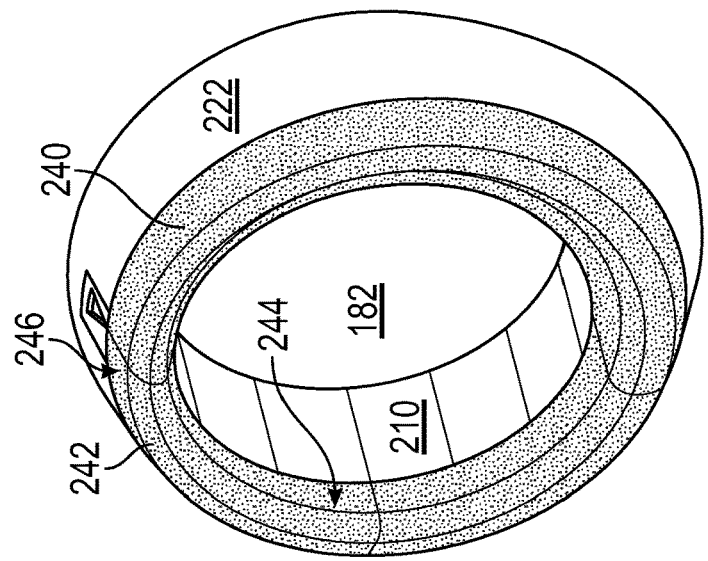
FIGS. 7A, 7B, and 7C are perspective views of the lip of the nacelle illustrating different operating configurations of heaters in the nacelle.
Figure 7B:
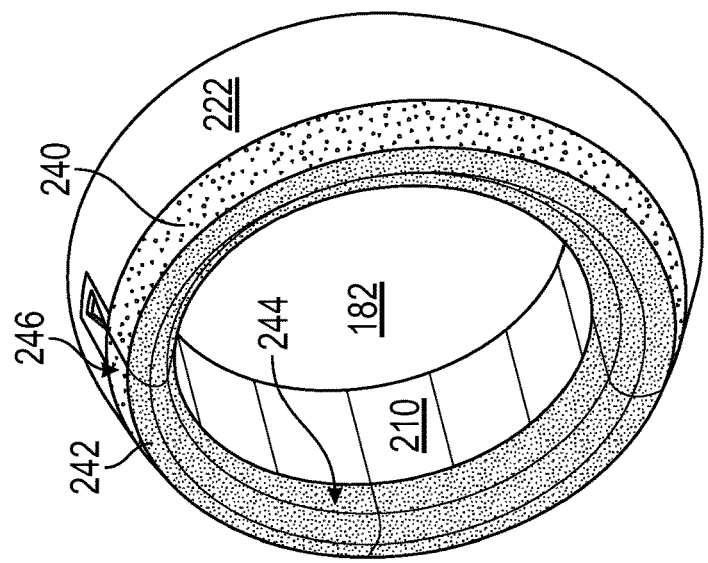
Figure 7C:
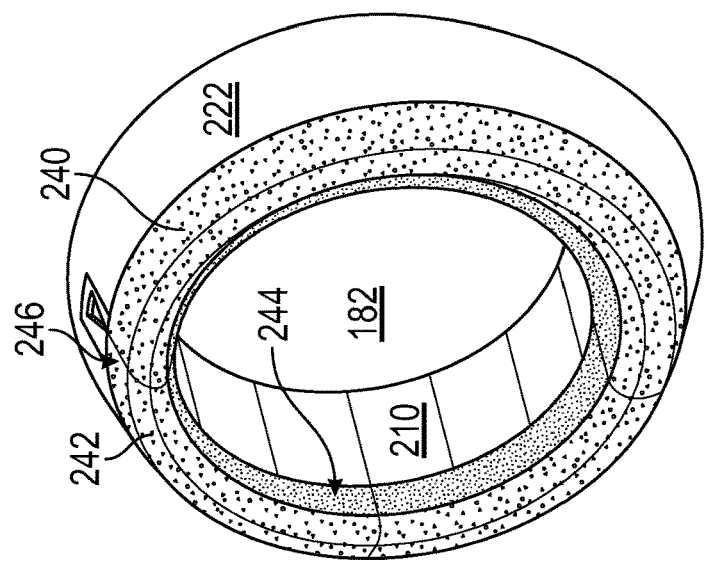

FIGS. 7A, 7B, and 7C are perspective views of the lip 240 illustrating different operating configurations of the plurality of zones, such as the leading portion 242, the inner portion 244, and the outer portion 246. The engine 100 may be operated at a plurality of power conditions. As used herein, "power conditions" may refer to the amount of propulsive thrust produced by the engine 100. The plurality of power conditions may include a high-power condition, a part-power condition, and a low-power condition. In the high-power condition, the engine 100 produces a greater amount of propulsive thrust than each of the part-power condition and the low-power condition. In the part-power condition, the engine 100 produces a greater amount of propulsive thrust than the low-power condition, but the engine 100 produces less propulsive thrust in the part-power condition than the high-power condition. The engine 100 produces less propulsive thrust in the low-power condition than in either of the high-power condition and the part-power condition. In some embodiments, the low-power condition is an idle condition for the engine 100 or minimum throttle setting for a particular operation of the aircraft 10. Such idle conditions may include, for example, ground idle conditions, flight idle conditions, and or, approach idle conditions.

FIG. 7A shows an operating configuration with the engine 100 operating in a high-power condition and a high angle of attack for takeoff or climb. With the engine 100 operating in such a condition, the engine 100 draws a significant amount of air into the inlet 182 of the nacelle 200. In such a condition, the stagnation point may be located on the outer portion 246. The controller 170 controls the heat source (e.g., the heating elements 262 in FIG. 3) of the outer portion 246 to have a high duty cycle. In some embodiments, this duty cycle may be a full power condition. In this condition, water located on the outer portion 246 may run back to the inner barrel 210 and, thus, the controller 170 also controls the heat source (e.g., the heating elements 262 in FIG. 3) of the leading portion 242 and the inner portion 244 to have a high duty cycle. Accordingly, there is no reduction in heater power for this condition.

FIG. 7B shows an operating configuration for the heat source (e.g., the heating elements 262 in FIG. 3) with the engine 100 operating in a part-power condition. The part-power condition may be, for example, a power condition for cruise with the aircraft 10 at a level position. In such a condition, the stagnation point may be located on the leading portion 242, sometimes also referred to as the highlight. The controller 170 controls the heat source (e.g., the heating elements 262 in FIG. 3) of the leading portion 242 to have a high duty cycle. Water on the outer portion 246 is unlikely to run into the inner barrel 210, and the duty cycle of the heat source (e.g., the heating elements 262 in FIG. 3) of the outer portion 246 can be reduced relative to the duty cycle of the heat source (e.g., the heating elements 262 in FIG. 3) of the leading portion 242. The controller 170, thus, operates the heat source (e.g., the heating elements 262 in FIG. 3) of the outer portion 246 to a duty cycle that is less than the duty cycle of the heat source (e.g., the heating elements 262 in FIG. 3) of the leading portion 242. In this embodiment, the controller 170 also controls the heat source (e.g., the heating elements 262 in FIG. 3) of the inner portion 244 to have a high duty cycle, higher than the duty cycle of the heat source (e.g., the heating elements 262 in FIG. 3) of the outer portion 246. In FIGS. 7A to 8B, the high duty cycle is illustrated by the dark (dance) stippling and the reduced duty cycle is illustrated by the light stippling.

FIG. 7C shows an operating configuration for the heat source (e.g., the heating elements 262 in FIG. 3) with the engine 100 operating in a low-power condition. The low-power condition may be, for example, an idle condition of the engine 100 for descent of the aircraft 10. In such a condition, the stagnation point may be located on the inner portion 244. The controller 170 controls the heat source (e.g., the heating elements 262 in FIG. 3) of the inner portion 244 to have a high duty cycle. Only water on the inner portion 244 is likely to run into the inner barrel 210, and the duty cycle of the heat source (e.g., the heating elements 262 in FIG. 3) of both the leading portion 242 and the outer portion 246 can be reduced relative to the duty cycle of the heat source (e.g., the heating elements 262 in FIG. 3) of the inner portion 244. The controller 170, thus, operates the heat source (e.g., the heating elements 262 in FIG. 3) of the leading portion 242 and the outer portion 246 to a duty cycle that is less than the duty cycle of the heat source (e.g., the heating elements 262 in FIG. 3) of the inner portion 244.

Figure 8B:
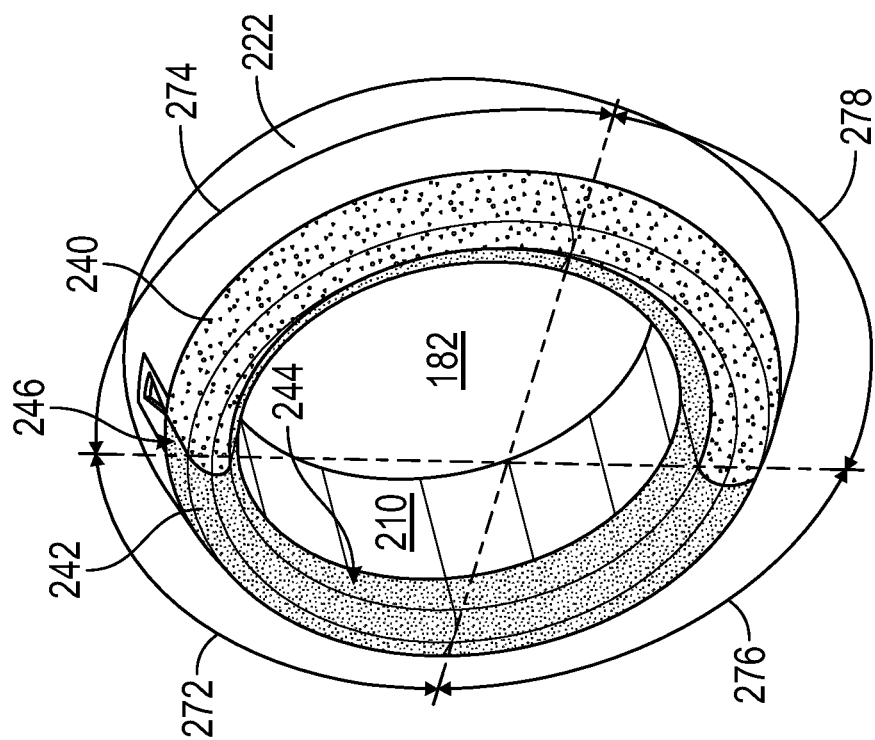
FIGS. 8A and 8B are perspective views of the lip of the nacelle illustrating different operating configurations of heaters in the nacelle.
Figure 8A:
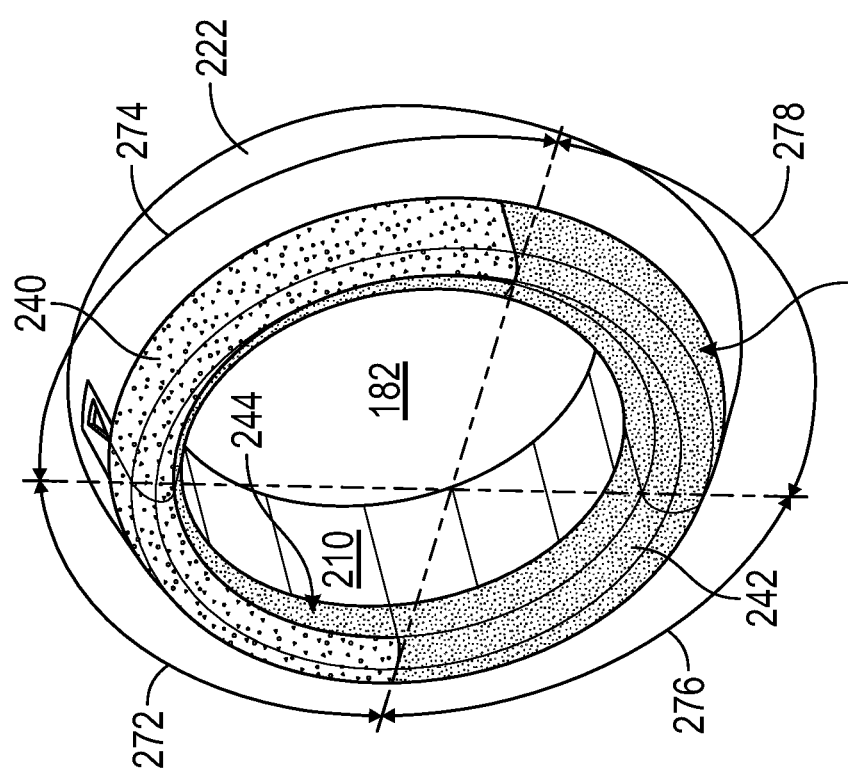

FIGS. 8A and 8B also are perspective views of the lip 240 illustrating different operating configurations of the heat source (e.g., the heating elements 262 in FIG. 3). In FIGS. 7A to 7C, the power of the engine 100 was a primary driver of the operating configurations of the heat source (e.g., the heating elements 262 in FIG. 3), but the direction of airflow into the nacelle 200 may also impact the stagnation point. When the airflow into the nacelle 200 is at an angle relative to the longitudinal centerline 101 of the engine 100, the stagnation point may be asymmetrically located on the lip 240 of the nacelle 200. FIGS. 8A and 8B illustrate such conditions. To account for this asymmetric airflow, the lip 240 of the nacelle 200 is also divided into a plurality of regions (or zones) in a circumferential direction. In this embodiment, the lip 240 has four circumferential zones corresponding to four quadrants of the lip 240 of the nacelle 200, but any suitable number of zones may be used. The lip 240 includes an upper-right zone 272, an upper-left zone 274, a lower-right zone 276, and a lower-left zone 278, and the controller 170 is configured to selectively control the heat source (e.g., the heating elements 262 in FIG. 3) in each of these zones.

In both FIGS. 8A and 8B, the engine 100 is operating in a part power condition such that, if not for the angle of the airflow into the nacelle 200, the stagnation point would be located on the leading portion 242. FIG. 8A illustrates a condition in which the aircraft 10 and the engine 100 have a high angle of attack. In this condition, the aircraft 10 is pitched upward such that the longitudinal centerline 101 of the engine 100 is angled upward. In this condition, the upper-right zone 272 and the upper-left zone 274 of both the leading portion 242 and the outer portion 246 are regions of low air impingement. Accordingly, the duty cycle of the heat source (e.g., the heating elements 262 in FIG. 3) located in the upper-right zone 272 and the upper-left zone 274 of both the leading portion 242 and the outer portion 246 are reduced relative to the heat source (e.g., the heating elements 262 in FIG. 3) in the other zones and regions.

FIG. 8B shows an operating configuration where the engine 100 is exposed to a right sideslip condition. In this condition, air is angled into the nacelle 200 from the right, and the upper-left zone 274 and the lower-left zone 278 are regions of low air impingement. Accordingly, the duty cycle of the heat source (e.g., the heating elements 262 in FIG. 3) located in the upper-left zone 274 and the lower-left zone 278 of both the leading portion 242 and the outer portion 246 are reduced relative to the heat source (e.g., the heating elements 262 in FIG. 3) in the other zones and regions. When the engine 100 is exposed to a left sideslip condition, the upper-right zone 272 and the lower-right zone 276 are regions of low air impingement, and the duty cycle of the heat source (e.g., the heating elements 262 in FIG. 3) located in the upper-right zone 272 and the lower-right zone 276 of both the leading portion 242 and the outer portion 246 are reduced relative to the heat source (e.g., the heating elements 262 in FIG. 3) in the other zones and regions.

FIG. 9 is a schematic flow chart for a method of controlling the heat source (e.g., the heating elements 262 in FIG. 3) in the manner discussed above. The ice protection system 260 is activated in step S305. In some embodiments, this step may be a manual step, such as the pilots of the aircraft 10 selecting an option to activate the ice protection system 260, but, in other embodiments, the controller 170 is configured to receive inputs and to determine from those inputs that icing conditions are present. Such inputs include, for example, the airspeed of the aircraft 10, temperature, humidity, pressure, and altitude of the aircraft 10. The controller 170 may be directly communicatively coupled to sensors to determine these inputs. The controller 170 may also be indirectly coupled to such sensors and receive inputs from another source, such as a flight controller for the aircraft 10. When the controller 170 determines that icing conditions are present, the controller 170 activates the ice protection system 260.

In step S310, the controller 170 determines the operating condition of the engine 100. The controller 170 is configured to receive inputs, and to determine from those inputs, the condition of the engine 100. Such inputs include, for example, the airspeed of the aircraft 10, the velocity and direction of the wind (such as crosswind velocity), the angle of attack of the aircraft 10, and the mass flow of air through the engine 100. The controller 170 may be directly communicatively coupled to sensors to determine these inputs. The controller 170 may also be indirectly coupled to such sensors and receive inputs from another source, such as a flight controller for the aircraft 10. In some embodiments, the controller 170 is configured to calculate these parameters. For example, mass flow through the engine 100 and, more specifically, into the inlet 182, may not be directly measured. Instead, the mass flow may be calculated using, for example, airspeed of the aircraft 10.

In step S315, the controller 170 then selectively operates the heat source (e.g., the heating elements 262 in FIG. 3) based on the operating condition of the aircraft 10 and the engine 100, such as in the manner discussed above with respect to FIGS. 7A to 8B. The heat source (e.g., the heating elements 262 in FIG. 3) may be controlled using an open control approach when, based on the operating condition of the aircraft 10 and the engine 100, an on and off time (timer) is set by the controller 170 in step S320. The on and off time determines the duty cycle of the heating element 262 and, thus, the temperature of the region or zone of the lip 240. In other embodiments, other parameters may be used to control the heat source (e.g., the heating elements 262 in FIG. 3) and the temperature, such as setting the resistance of the heating element 262. The heat source (e.g., heating element 262 (heaters)) are then activated in step S325 according to the timers in step S320.

Figure 10:
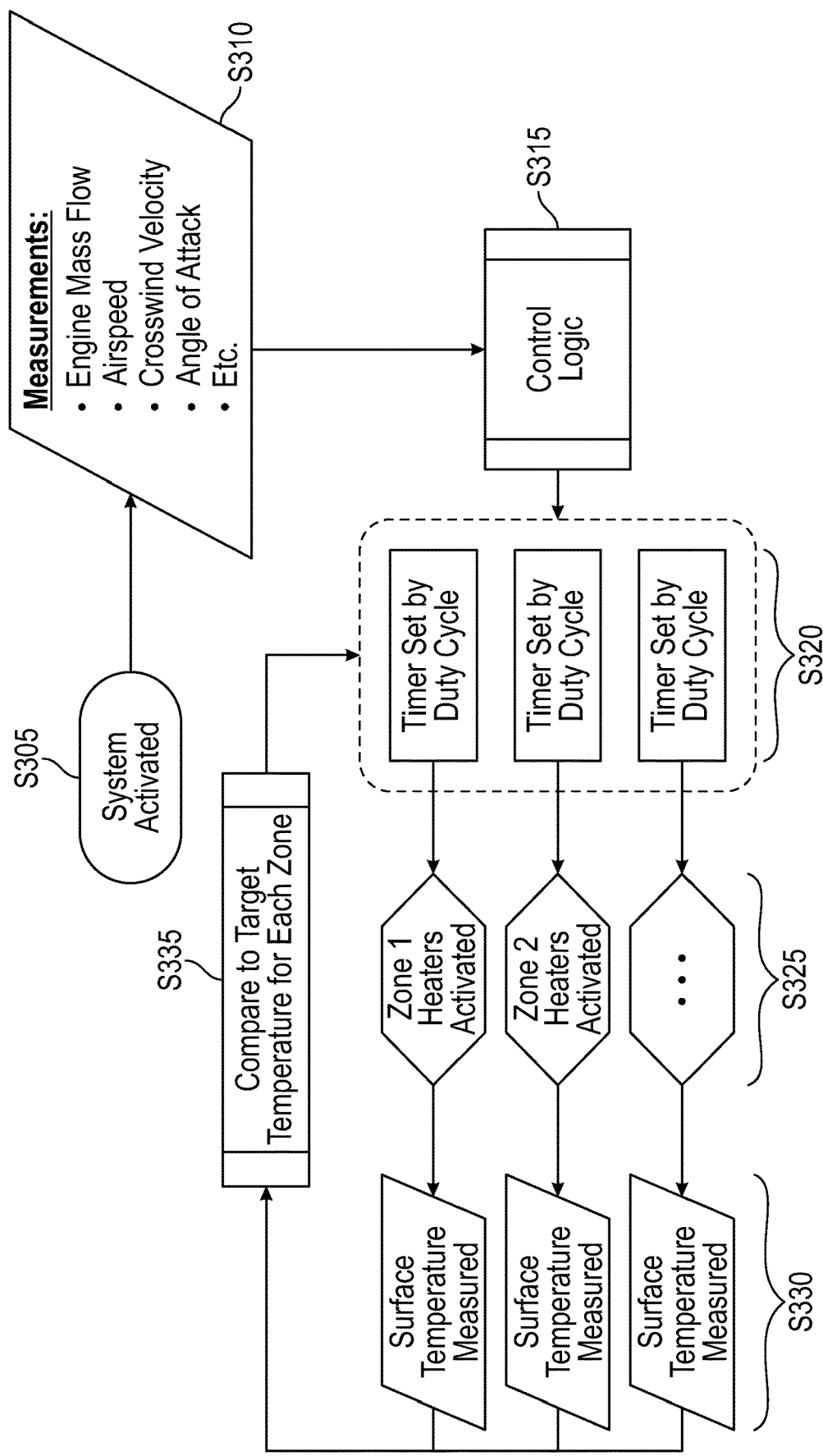
FIG. 10 is a schematic flow chart for another method of controlling the heaters.

FIG. 10 is a schematic flow chart for another method of controlling of the heat source (e.g., the heating elements 262 in FIG. 3). The method shown in FIG. 10 includes each of the steps S305 to S325 discussed above, but, instead of an open control, this method includes a feedback loop. Each of the regions or zones may include a temperature sensor configured to measure the temperature of the outer surface 252 (or another suitable surface). The temperature sensor measures the temperature of the outer surface 252 in step S330 for each of the zones. The temperature sensor is communicatively coupled to the controller 170, and the controller 170 in step S335 compares the measured temperature to a target temperature for each zone. The target temperature for each zone may be determined in step S315 by the controller 170 based on the operating conditions of the aircraft 10 and the engine 100. The controller 170 may control the heat source (e.g., the heating elements 262 in FIG. 3) based on the target temperature by, for example, adjusting the duty cycle (timer). The controller 170 returns to step S320 to adjust the duty cycle (timer) based on the comparison between the measured temperature and the target temperature. For example, if the measured temperature is greater than the target temperature, the duty cycle may be reduced, and, if the measured temperature is less than the target temperature, the duty cycle may be increased.

In the embodiment discussed above, the ice protection system 260 is applied to the lip 240 of the nacelle 200. The ice protection system 260 may, however, be applied to other suitable external surfaces of the aircraft and the engine, particularly, external surfaces configured to have air flow over the external surface as the aircraft flies through the air, and the ice protection system 260 may applied to other surfaces beyond aircraft. These external surfaces of the aircraft and the engine may include, for example, various inlets and/or airfoils of the aircraft 10 or other surfaces internal to the engine 100, such as booster splitter or inlet guide vanes. Similar to the lip 240 of the nacelle 200, such surfaces may have a plurality of zones and the controller 170 may be configured to selectively control at least one heating element 262 in each zone of the plurality of zones based on an operating condition related to the air flowing over the external surface. Such operating conditions include those impacting the stagnation point of air on the external surface and may include, for example, the angle of attack of the aircraft 10.

As shown in FIG. 1, the leading edge 20 of the wing 14 is another example of an external surface implementing the ice protection system 260 discussed herein. The leading edge 20 of the wing 14 may include heating elements 262 and be divided into a plurality of zones in a manner similar to the lip 240 of the nacelle 200 discussed above. For example, the leading edge 20 may have a U-shape with a leading portion 22, a lower portion 24, and an upper portion 26. Heating elements 262 of the leading portion 22 of the wing 14 may be operated in a manner similar to that of the leading portion 242 of the nacelle 200. Heating elements 262 of the lower portion 24 of the wing 14 may be operated in a manner similar to that of the inner portion 244 of the nacelle 200. Heating elements 262 of the upper portion 26 of the wing 14 may be operated in a manner similar to that of the outer portion 246 of the nacelle 200. In particular, the controller 170 may selectively control the heating elements 262 in each of the leading portion 22, the lower portion 24, and the upper portion 26, based on, for example, the angle of attack of the aircraft 10 and, more specifically, the wing 14. Similar to the wing 14, the ice protection system 260 may also be implemented on horizontal and vertical surfaces of the tail (empennage 16).

In the embodiments discussed above, each of the lower portion 24 and the upper portion 26 of the wing 14, and the inner portion 244 and the outer portion 246 of the nacelle 200 are downstream, relative to the direction of the airflow over the external surface, of the leading portion 22 of the wing 14 or the leading portion 242 of the nacelle 200, respectively. As used herein, the lower portion 24 of the wing 14 and the inner portion 244 of the nacelle 200 may be a first downstream portion, and the upper portion 26 of the wing 14 and the outer portion 246 of the nacelle 200 may be a second downstream portion.

Further aspects of the present disclosure are provided by the subject matter of the following clauses.

An ice protection system for an aircraft surface. The ice protection system includes an external surface for an aircraft configured to have air flow over the external surface. The external surface has a plurality of zones. At least one heat source is thermally coupled to the external surface in each zone of the plurality of zones, and a controller is configured to selectively control the at least one heat source in each zone of the plurality of zones based on an operating condition related to the air flowing over the external surface.

The ice protection system of the preceding clause, wherein the heat source is one of hot air or an electrical heating element.

The ice protection system of any preceding clause, wherein the controller is configured to selectively control the at least one heat source in each zone of the plurality of zones to one of a plurality of heating levels. The plurality of heating levels including a high heating level and a reduced heating level. The heat produced in a set time interval for one of the plurality of zones is less when the zone is operated at the reduced heating level than when the zone is operated at the high heating level.

The ice protection system of any preceding clause, wherein the controller selectively controls the at least one heat source to one of the plurality of heating levels by controlling the duty cycle of the at least one heat source. The duty cycle of the at least one heat source in the reduced heating level being less than the duty cycle of the at least one heat source in the high heating level.

The ice protection system of any preceding clause, wherein each zone of the plurality of zones includes a temperature sensor configured to measure the temperature of the external surface. The controller selectively controls the at least one heat source to one of the plurality of heating levels based on a target temperature for the external surface.

The ice protection system of any preceding clause, wherein the external surface has a leading portion, a first downstream portion, and a second downstream portion. The first downstream portion and the second downstream portion are downstream of the leading portion in a direction of the airflow.

The ice protection system of any preceding clause, wherein the external surface has a U-shape. The first downstream portion is an upper surface, and the second downstream portion is a lower surface.

The ice protection system of any preceding clause, wherein the external surface is a leading edge of a wing of the aircraft. The first downstream portion is an upper surface, and a second downstream portion is a lower surface.

The ice protection system of any preceding clause, wherein the operating condition is an angle of attack of the wing.

A gas turbine engine including, the ice protection system of any preceding clause, and a nacelle defining an inlet. The nacelle includes a lip, and the lip is the external surface.

The gas turbine engine of the preceding clause, wherein the plurality of zones includes a plurality of regions in a circumferential direction of the nacelle.

The gas turbine engine of any preceding clause, wherein the plurality of zones includes at least one upper zone and at least one lower zone. The controller is configured to selectively control the at least one heat source in each zone of the plurality of zones to one of a plurality of heating levels. The plurality of heating levels includes a high heating level and a reduced heating level. The heat produced in a set time interval for one of the plurality of zones is less when the zone is operated at the reduced heating level than when the zone is operated at the high heating level. The operating condition is an angle of attack of the engine, and the controller is configured to operate the at least one lower zone at the high heating level and the at least one upper zone at the reduced heating level, when the engine has an upward angle of attack.

The gas turbine engine of any preceding clause, wherein the plurality of zones includes at least one left zone and at least one right zone. The controller is configured to selectively control the at least one heat source in each zone of the plurality of zones to one of a plurality of heating levels. The plurality of heating levels includes a high heating level and a reduced heating level. The heat produced in a set time interval for one of the plurality of zones is less when the zone is operated at the reduced heating level than when the zone is operated at the high heating level. The operating condition is a cross-wind direction. The controller is configured to operate one of the at least one left zone and the at least one right zone at the high heating level and the other one of the at least one left zone and the at least one right zone at the reduced heating level based on the cross-wind direction.

The gas turbine engine of any preceding clause, wherein the plurality of zones includes a leading portion, an inner portion, and an outer portion.

The gas turbine engine of any preceding clause, wherein the engine includes a plurality of power conditions and the operating condition is the power condition of the engine.

The gas turbine engine of any preceding clause, wherein the plurality of power conditions includes a high-power condition, a part-power condition, and a low-power condition. The engine produces a greater amount of propulsive thrust in the high-power condition than in each of the part-power condition and the low-power condition. The engine produces a greater amount of propulsive thrust in the part-power condition than in the low-power condition. The controller is configured to selectively control the at least one heat source in each zone of the plurality of zones to one of a plurality of heating levels. The plurality of heating levels include a high heating level and a reduced heating level. The heat produced in a set time interval for one of the plurality of zones being less when the zone is operated at the reduced heating level than when the zone is operated at the high heating level.

The gas turbine engine of any preceding clause, wherein, when the engine is operating in the high-power condition, the controller is configured to operate each of the leading portion, the inner portion, and the outer portion at the high heating level.

The gas turbine engine of any preceding clause, wherein, when the engine is operating in the part-power condition, the controller is configured to operate the outer portion at the reduced heating level.

The gas turbine engine of any preceding clause, wherein, when the engine is operating in the part-power condition, the controller is configured to operate each of the leading portion and the inner portion at the high heating level.

The gas turbine engine of any preceding clause, wherein, when the engine is operating in the low-power condition, the controller is configured to operate each of the leading portion and the outer portion at the reduced heating level.

The gas turbine engine of any preceding clause, wherein, when the engine is operating in the part-power condition, the controller is configured to operate the inner portion at the high heating level.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A gas turbine engine comprising:
a nacelle defining an inlet and including a lip, the lip having an external surface configured to have air flow over the external surface, the external surface having a plurality of zones in a circumferential direction of the nacelle, the plurality of zones includes an upper zone and a lower zone; and
an ice protection system for the external surface of the lip, the ice protection system including:
at least one heat source thermally coupled to the external surface in each zone of the plurality of zones; and
a controller configured to selectively control the at least one heat source in each zone of the plurality of zones based on an angle of attack of the gas turbine engine,
wherein the controller is configured to selectively control the at least one heat source in each zone of the plurality of zones to one of a plurality of heating levels, the plurality of heating levels including a high heating level and a reduced heating level, heat produced in a set time interval for one of the plurality of zones being less when the zone is operated at the reduced heating level than when the zone is operated at the high heating level, and
wherein the controller is configured to operate the lower zone at the high heating level and the upper zone at the reduced heating level when the gas turbine engine has an upward angle of attack.

2. The gas turbine engine of claim 1, wherein the heat source is one of hot air or an electrical heating element.

3. The gas turbine engine of claim 1, wherein the controller selectively controls the at least one heat source to one of the plurality of heating levels by controlling a duty cycle of the at least one heat source, the duty cycle of the at least one heat source in the reduced heating level being less than the duty cycle of the at least one heat source in the high heating level.

4. The gas turbine engine of claim 1, wherein each zone of the plurality of zones includes a temperature sensor configured to measure a temperature of the external surface, and
wherein the controller selectively controls the at least one heat source to one of the plurality of heating levels based on a target temperature for the external surface.

5. The gas turbine engine of claim 1, wherein the plurality of zones includes a left zone and a right zone, and
wherein the controller is configured to operate one of the left zone or the right zone at the high heating level and the other one of the left zone or the right zone at the reduced heating level based on a cross-wind direction.

6. The gas turbine engine of claim 1, wherein the upper zone is one of a plurality of upper zones, the plurality of upper zones including a leading portion, an inner portion, and an outer portion, the controller being configured to operate at least one of the leading portion or the outer portion at the reduced heating level when the gas turbine engine has an upward angle of attack.

7. A gas turbine engine including a plurality of power conditions, the plurality of power conditions including a high-power condition, a part-power condition, and a low-power condition, the gas turbine engine producing a greater amount of propulsive thrust in the high-power condition than in each of the part-power condition and the low-power condition, the gas turbine engine producing a greater amount of propulsive thrust in the part-power condition than in the low-power condition, the gas turbine engine comprising:
a nacelle defining an inlet and including a lip, the lip having an external surface configured to have air flow over the external surface, the external surface having a plurality of zones, the plurality of zones including a leading portion, an inner portion, and an outer portion; and
an ice protection system for the external surface of the lip, the ice protection system including:
at least one heat source thermally coupled to the external surface in each zone of the plurality of zones; and
a controller configured to selectively control the at least one heat source in each zone of the plurality of zones to one of a plurality of heating levels based on a current power condition of the plurality of power conditions of the gas turbine engine, the plurality of heating levels including a high heating level and a reduced heating level, heat produced in a set time interval for one of the plurality of zones being less when the zone is operated at the reduced heating level than when the zone is operated at the high heating level, and
wherein the heating level of the outer portion is different for one of the high-power condition, the part-power condition, or the low-power condition than another one of the high-power condition, the part-power condition, or the low-power condition.

8. The gas turbine engine of claim 7, wherein, when the gas turbine engine is operating in the high-power condition, the controller is configured to operate each of the leading portion, the inner portion, and the outer portion at the high heating level.

9. The gas turbine engine of claim 7, wherein, when the gas turbine engine is operating in the part-power condition, the controller is configured to operate the outer portion at the reduced heating level.

10. The gas turbine engine of claim 9, wherein, when the gas turbine engine is operating in the part-power condition, the controller is configured to operate each of the leading portion and the inner portion at the high heating level.

11. The gas turbine engine of claim 7, wherein, when the gas turbine engine is operating in the low-power condition, the controller is configured to operate each of the leading portion and the outer portion at the reduced heating level.

12. The gas turbine engine of claim 11, wherein, when the gas turbine engine is operating in the part-power condition, the controller is configured to operate the inner portion at the high heating level.

13. The gas turbine engine of claim 7, wherein the heat source is one of hot air or an electrical heating element.

14. The gas turbine engine of claim 7, wherein each zone of the plurality of zones includes a temperature sensor configured to measure a temperature of the external surface, and
wherein the controller selectively controls the at least one heat source to one of the plurality of heating levels based on a target temperature for the external surface.

15. A gas turbine engine comprising:
a nacelle defining an inlet and including a lip, the lip having an external surface configured to have air flow over the external surface, the external surface having a plurality of zones in a circumferential direction of the nacelle, the plurality of zones includes a left zone and a right zone; and
an ice protection system for the external surface of the lip, the ice protection system including:
at least one heat source thermally coupled to the external surface in each zone of the plurality of zones; and
a controller configured to selectively control the at least one heat source in each zone of the plurality of zones based on a cross-wind direction,
wherein the controller is configured to selectively control the at least one heat source in each zone of the plurality of zones to one of a plurality of heating levels, the plurality of heating levels including a high heating level and a reduced heating level, heat produced in a set time interval for one of the plurality of zones being less when the zone is operated at the reduced heating level than when the zone is operated at the high heating level, and
wherein the controller is configured to operate one of the left zone or the right zone at the high heating level and the other one of the left zone or the right zone at the reduced heating level based on the cross-wind direction.

16. The gas turbine engine of claim 15, wherein the left zone is one of a plurality of left zones, the plurality of left zones including a leading portion, an inner portion, and an outer portion,
the controller being configured to operate at least one of the leading portion or the outer portion at the reduced heating level when the cross-wind direction is from the right.

17. The gas turbine engine of claim 15, wherein the right zone is one of a plurality of right zones, the plurality of right zones including a leading portion, an inner portion, and an outer portion, the controller being configured to operate at least one of the leading portion or the outer portion at the reduced heating level when the cross-wind direction is from the left.

18. The gas turbine engine of claim 15, wherein the heat source is one of hot air or an electrical heating element.

19. The gas turbine engine of claim 15, wherein the controller selectively controls the at least one heat source to one of the plurality of heating levels by controlling a duty cycle of the at least one heat source, the duty cycle of the at least one heat source in the reduced heating level being less than the duty cycle of the at least one heat source in the high heating level.

20. The gas turbine engine of claim 15 wherein each zone of the plurality of zones includes a temperature sensor configured to measure a temperature of the external surface, and
wherein the controller selectively controls the at least one heat source to one of the plurality of heating levels based on a target temperature for the external surface.

* * * * *